Jan. 4, 1955  J. F. ADAMS ET AL  2,698,779
CONCENTRATION OF FUSIBLE CAUSTIC ALKALIES
Filed Aug. 14, 1950  3 Sheets-Sheet 1

STEAM ⟶ ⟵ FEED

INVENTORS,
JAMES E. ADAMS,
RUSSELL L. BAUER,
GEORGE E TAYLOR,
BY
ATTORNEY.

INVENTORS,
JAMES E. ADAMS,
RUSSELL L. BAUER,
GEORGE E. TAYLOR,
BY
ATTORNEY.

Jan. 4, 1955 J. F. ADAMS ET AL 2,698,779
CONCENTRATION OF FUSIBLE CAUSTIC ALKALIES
Filed Aug. 14, 1950 3 Sheets-Sheet 3

INVENTORS,
JAMES E. ADAMS,
RUSSELL L. BAUER,
GEORGE E. TAYLOR,
BY
ATTORNEY.

2,698,779

CONCENTRATION OF FUSIBLE CAUSTIC ALKALIES

James F. Adams, St. Louis, Russell L. Bauer, Brentwood, and George E. Taylor, St. Louis, Mo., assignors to Monsanto Chemical Company, St. Louis, Mo., a corporation of Delaware Application August 14, 1950, Serial No. 179,162

2 Claims. (Cl. 23—293)

This invention relates to a novel process for the concentration of aqueous solutions of fusible caustic alkalies, more particularly, this invention relates to a process for the manufacture of substantially anhydrous alkali metal hydroxides (caustic alkalies) from aqueous solutions of these compounds.

The process of this invention may be used for the concentration of aqueous solutions of any of the fusible alkali metal hydroxides such as caustic soda (sodium hydroxide) or caustic potash (potassium hydroxide), however, the process of this invention has particular application to the manufacture of the substantially anhydrous caustic alkalies of commerce. For example, the manufacture of the substantially anhydrous sodium hydroxide of commerce which contains 1% or less by weight of water and which is known as "fused" caustic soda. While the process of this invention has particular application to the manufacture of the substantially anhydrous caustic alkalies containing 1% or less of water, this process may be also operated advantageously to produce caustic alkalies containing more than 1% water, for example, caustic alkalies containing 1%; 1½%; 2%; 2½%; 3%; and 5% or even higher amounts of water. On the other hand, the process of this invention may be used to concentrate aqueous caustic alkali solutions, such as, for example, the evaporation-concentration of an aqueous (such as 50%) caustic alkali solution to produce more concentrated solutions such as those containing of the order of 65, 70, 75, 80, 85, 90 and 95% caustic alkali.

A large portion of the caustic soda of commerce is prepared by the electrolysis of brine and the effluent liquors from the electrolytic cells normally contain about 120 to 140 grams of sodium hydroxide per liter of liquor. These liquors are then evaporated to a concentration of between about 40% and 75% sodium hydroxide. This evaporation up to about 75% sodium hydroxide is normally carried out in evaporators wherein the heat requirements for the evaporation of the water is supplied by means of indirect heat exchange with steam. A 75% concentration of caustic soda is about the upper limit which can be practically obtained where the heat requirements for evaporation of the water is supplied by means of indirect heat exchange with steam.

The only method for the manufacture of "fused" caustic soda, that is, for the separation of the chemically combined and solvent water from the caustic soda after the solutions of caustic soda have been evaporated to as high a concentration as possible by indirect heat exchange with steam, that has met general industrial acceptance has been the evaporation-dehydration of 40 to 75% caustic soda solutions in direct-fired cast-iron fusion pots each of which commonly has a capacity of approximately 19 tons. This operation is entirely batch-wise, and the complete cycle of charging the fusion pots, heating and dehydration takes three to four days. The process becomes even more cumbersome when, as is usual practice, in an effort to keep the temperature variations of a single pot to a minimum, the charge is initially heated for 24 to 48 hours in one fusion pot and then transferred to a different fusion pot for a second heating period at higher temperatures. The operation as described suffers under many serious disadvantages such as the long time cycle, the short life of the fusion pots, the high heating costs, and the usual inherent disadvantages of a cumbersome, batch-wise and empirical process. Industry has expended considerable effort to find an improved process for the manufacture of fused caustic soda by the dehydration of 40 to 75% aqueous solutions of caustic soda. Some of the more successful improved processes have used solvent extractions and various organic distilling aids to remove the combined and solvent water from the more concentrated caustic alkali solutions, and while many of these improved processes have proved operable, they have not been entirely satisfactory for large scale commercial operations.

Herein, the phrase, "evaporation-dehydration" is used as descriptive of the removal of the chemically combined and solvent water from aqueous caustic soda solutions solely by the use of heat to effect the removal of such water by vaporization or evaporation, in contrast to those processes wherein solvents or distilling aids are used with or without the addition of heat to effect the removal of the water. In the attempt to devise new methods for the manufacture of fused caustics, a severe handicap lies in the fact that it is most difficult to obtain materials of construction for the process equipment which will withstand the vicious attack of caustic soda on these materials of construction at the high temperatures required for the dehydration of the caustic soda solutions. The most pronounced deleterious effect of caustic soda on the materials of construction is one which is described by those familiar with the art as caustic embrittlement. Caustic embrittlement is evidenced by the formation of a multitude of small surface cracks, general degradation and structural weakening of the materials of construction. Caustic embrittlement is prevalent when caustic soda is held in contact with these materials of construction, particularly steels, such as carbon steels and chromium (18.5%) steel, at temperatures of 140° F. and above. While nickel and nickel alloys exhibit the greatest resistance to the corrosive tendencies of caustic soda, even these materials evidence degradation when in contact with caustic soda under certain conditions. The corrosion problems are increased even more at temperatures of 250–850° F. which temperatures are commonly encountered in the dehydration of caustic soda solutions. The most critical conditions, from a corrosion or caustic embrittlement standpoint, for steels and even nickel in contact with caustic soda appears to be somewhere in the neighborhood of 70–85% concentration and temperatures of 350–450° F. whereas substantially anhydrous caustic soda at temperatures of 600° F. and above seems to cause substantially less caustic embrittlement and corrosion. Therefore, the severe corrosion and caustic embrittlement problems are encountered in the processing equipment during the critical range when the caustic is being concentrated from about 40% up through about 90% through a temperature range of 250–550° F. after which point the caustic embrittlement problems are materially minimized.

Other problems which are severe obstacles to a departure from the conventional cast-iron fusion pot concentrating processes are the difficulties of providing proper and adequate circulation of the fused caustic at 250–850° F. within the dehydration apparatus such as by pumping or stirring. Poor or inadequate circulation within the dehydration apparatus results in localized overheating of the caustic soda and the equipment, particularly at the high temperature heat transfer areas, and this localized overheating materially aggravates the problems of caustic embrittlement and other corrosion degradation of the materials of construction at these points. Due to the quantities of caustic handled during concentration, circulation has been provided by means of huge stirrers or circulatory mechanical pumping of the fused liquid caustic soda, however such stirring is highly inefficient and such pumping is difficult because the caustic soda at the temperatures involved readily attacks the gland packings of the pumps and otherwise causes severe corrosion of the pumps and other operating difficulties.

Another problem which has always been a severe obstacle to attempts to place the evaporation-dehydration of caustic soda solutions on a continuous basis is evidenced by the long time-cycle of three to four days for the conventional fusion pot method. Large amounts of heat are required for the evaporation-dehydration of caustic soda solution to supply latent heat requirements for the changes in physical states and the additional heat requirements for the temperature increases for each physical state.

The problem of getting such sufficiently high heat transfer rate at temperatures of the order of 750° F. which would provide a commercially economical rate of anhydrous caustic soda production has been one of the biggest impediments toward placing the evaporation-dehydration of caustic soda solutions on a continuous basis.

For the successful operation of a continuous process for the evaporation-dehydration of aqueous solutions of caustic soda, there must be a high rate of heat transfer of the large heat requirements for rapidly raising the temperature of the water and caustic soda contained in the aqueous caustic soda feed solutions from some temperature just above their solidifying points, (for example, from about 175° F. for 70% caustic soda solutions and from about room temperature for 50% caustic soda solutions) up to a temperature in excess of 610° F., which is roughly the solidifying temperature of anhydrous caustic soda. In addition to the heat requirements to raise the temperature of the caustic and water in solution and after separation, large quantities of heat must be rapidly and continuously available to supply the heat requirements for the changes in physical states of the water and caustic soda during the evaporation-dehydration, such as the latent heat of solution, i. e., the heat input required to separate the water from the caustic soda; the latent heat of fusion of the caustic soda; the latent heat of transition of the caustic soda, i. e., the change from the solid alpha state of the solid beta state; and the latent heat of evaporation of the water. The sum of all these heat requirements will be herein referred to as the "heat requirements for evaporation-dehydration."

It is readily apparent that a successful continuous process for the evaporation-dehydration of caustic soda solutions must overcome two tremendous problems, namely the problem of obtaining rapid heat transfer in order that the heat requirements for evaporation-dehydration may be transferred in a minimum amount of time which will not exceed the maximum time permissible for a continuous process, and in addition, the problem of transferring those heat requirements for evaporation-dehydration rapidly enough when the lower temperature side of the heat transfer system is always above the minimum temperature of 610° F.

When considering these heat transfer problems, it is readily apparent why the conventional fusion-pot method for the evaporation-dehydration of caustic soda solutions involves a time cycle of three to four days, however, in the practice of this invention, these problems are readily overcome, and this invention provides a commercially economical process for the evaporation-dehydration of caustic soda solutions.

It is an object of this invention, therefore, to provide a novel process for the manufacture of substantially anhydrous fusible caustic alkalies which is a new continuous process for the evaporation-dehydration of aqueous solutions of these compounds.

A further object is to provide a novel continuous process for the concentration of aqueous solutions of caustic alkalies whereby caustic alkali solutions may be continuously concentrated to any desired concentration above the concentration of the feed caustic alkali solution up to and including substantially anhydrous caustic alkalies.

A further object of this invention is to provide a process for the manufacture of anhydrous caustic alkalies wherein the more corrosive caustic alkali solutions encountered during the stage of evaporation are confined to a minimum area within the dehydration apparatus which area is expandable and replaceable. A further object is to provide a process for the manufacture of anhydrous fused caustic alkalies wherein uniform and rapid circulation of the caustic alkalies over the high temperature heat transfer areas is accomplished without the use of mechanical stirrers or mechanical pumps and whereby localized overheating of the caustic alkalies at the high temperature heat transfer areas is substantially eliminated.

A specific object is to provide a process for the production of anhydrous caustic soda by the evaporation-dehydration of the caustic soda solutions, which new process provides for a high heat transfer rate which makes possible a commercially feasible process for the continuous evaporation-dehydration of caustic soda solutions with a high production rate of anhydrous caustic soda.

According to the present invention, generally stated, caustic alkali solutions may be concentrated by a continuous process by injecting the aqueous caustic alkali feed solutions into a body of a caustic alkali solution of the desired final higher concentration, or substantially the desired final higher concentration, maintained under proper temperature conditions which will effect the evaporation-dehydration of the aqueous caustic alkali solutions to the desired higher concentration.

According to a further embodiment of the present invention, substantially anhydrous caustic alkalies may be produced by a continuous process from aqueous solutions of the fusible caustic alkalies by injecting the aqueous caustic alkali solution into a hot molten body of the fused caustic alkali, maintained under the proper temperature conditions which will effect the evaporation-dehydration of the aqueous caustic alkali solutions to a substantially anhydrous degree. When anhydrous caustic soda, i. e., caustic soda containing 1% or less of water, is the desired product, a body of hot molten anhydrous caustic soda is maintained at an elevated temperature in excess of about 650° F. into which the aqueous feed solutions of caustic soda are injected for the dehydration of the caustic soda feed solutions. The temperature in excess of 650° F. may be maintained within the range of 650° F. to 850° F., but normally, this temperature is maintained within the range of about 710 to 750° F.

When a concentrated caustic soda solution other than substantially anhydrous caustic soda is the desired product, the relatively dilute aqueous feed solutions of caustic soda are injected into caustic soda of about the desired final concentration which is maintained at an elevated temperature which substantially corresponds to the boiling point of a caustic soda solution of the desired final concentration, as the boiling points of the caustic soda solution of the desired final concentration are the temperatures at which equilibrium conditions effect the evaporation-dehydration of the aqueous solution of caustic soda to the desired final concentration.

The following table gives the approximate temperatures at which equilibrium conditions between steam and an aqueous caustic soda solutions result in corresponding concentrations of caustic soda.

| Per cent caustic soda: | Approximate temperature of equilibrium conditions, °F. |
|---|---|
| 70 | 360 |
| 75 | 383 |
| 80 | 437 |
| 85 | 473 |
| 90 | 536 |
| 95 | 626 |
| 99 and above but less than 100% | 710–750 |

Therefore, for example, if 70% caustic soda were the desired product, then the aqueous feed solution is injected into a body of 70% caustic soda maintained as closely as possible to about 360° F., at which temperature equilibrium conditions between steam and the caustic soda solution would effect the evaporation-dehydration of the relatively dilute caustic soda feed solution to about 70% caustic soda solution.

A more specific embodiment of this invention for the concentration of aqueous solutions of caustic alkalies comprises maintaining a fluid body consisting of a caustic alkali at or about the desired final concentration in a fluid state and at or about temperatures at which equilibrium conditions will effect the evaporation-dehydration of the aqueous solutions of caustic alkalies to the desired higher final concentration in an upper zone from which this fluid body may flow by gravity, or be otherwise passed, to the lower portion of a substantially vertical elongated dehydration zone, heating and increasing the temperature of this fluid body during its flow or passage from the upper zone to the lower portion of the elongated dehydration zone by indirect heat exchange with a higher temperature heat source, returning this heated fluid body from the lower portion of the elongated dehydration zone up through the length of the elongated dehydration zone to the upper zone by means of a stream of steam which is introduced into the fluid body near the lower end of the elongated dehydration zone, simultaneously or intermittently with the injection of a stream of an aqueous caustic alkali feed solution to be concentrated.

A further embodiment of the novel process of this invention for the concentration of aqueous solutions of caustic alkalies to produce concentrated caustic alkali solutions up to and including substantially anhydrous caustic alkalies, comprises maintaining a fluid body consisting of a caustic alkali solution at or about the desired final concentration in a fluid state and at or about temperatures at which equilibrium conditions will effect the evaporation-dehydration of the aqueous solutions of caustic alkalies to the desired higher final concentration in an upper zone from which this fluid body may flow by gravity, or be otherwise passed, to a heat transfer zone wherein the fluid body is further heated to a higher temperature by indirect heat exchange with a higher temperature heat source, passing this heated fluid body from the heat exchange zone, as by gravity, to the lower portion of a substantially vertical elongated dehydration zone, returning the fluid body to the upper zone from the lower portion of the elongated zone up through the length of the elongated dehydration zone by injecting at least one stream of an aqueous solution of a caustic alkali to be concentrated into the fluid body near the lower portion of the elongated dehydration zone, whereby the additional heat acquired by the fluid body during its passage through the heat exchange zone is used to convert the water of the aqueous caustic alkali solutions into super-heated steam thereby promoting substantially instantaneous dehydration of the injected aqueous caustic alkali solution to form additional quantities of the caustic alkali solution of the desired higher concentration, and the rapid rise of the super-heated steam up through the length of the elongated zone returns the entire fluid body to the upper zone. The super-heated steam is removed from the upper zone at some point above the level of the fluid body maintained in the upper zone. A portion of the fluid body, which represents the caustic alkali solution of the desired final concentration, is then removed from the upper zone as product of the process and another portion of the fluid body is used to serve as the fluid body to circulate from the upper zone through the heat exchange zone to the lower portion of the elongated dehydration zone into which the aqueous feed solution of the caustic alkali is injected.

A still further embodiment of this invention which relates to the production of substantially anhydrous caustic alkalies from aqueous solutions of those caustic alkalies comprising maintaining a fluid body consisting of substantially anhydrous caustic alkali in a fluid state and at or above temperatures at which equilibrium conditions will effect the evaporation-dehydration of the aqueous solutions of caustic alkalies to produce substantially anhydrous caustic alkalies in an upper zone from which this fluid body may flow by gravity or be otherwise passed through a heat transfer zone wherein this fluid body consisting of substantially anhydrous caustic alkalies is heated to a higher temperature by indirect heat exchange with a higher temperature heat source, passing this heated fluid body from this heat exchange zone, preferably by gravity, to the lower portion of a substantially vertical elongated dehydration zone, returning the fluid body thereby contained in the lower portion of the elongated dehydration zone to the upper zone through the length of the elongated dehydration zone by injecting one or more streams of an aqueous feed solution of the caustic alkali, which is desired to be concentrated to substantially anhydrous caustic alkali, into the fluid body contained at the lower portion of the elongated dehydration zone, whereby the additional heat acquired by the fluid body during its passage through the heat exchange zone is used to convert the water of the aqueous caustic alkali feed solution into the super-heated steam, thereby promoting substantially instantaneous evaporation-dehydration of the aqueous caustic alkali solution to form super-heated steam and substantially anhydrous caustic alkali, and the rapid rise of the thus formed super-heated steam up through the length or upper portion of the elongated dehydration zone returns the entire quantity of substantially anhydrous caustic alkali, which consists of the anhydrous caustic alkali which is used as the heat transfer medium and also the additional anhydrous caustic alkali which was formed from the aqueous feed solution, is returned to the upper zone. In this upper zone the super-heated steam is removed from some point above the liquid level which is maintained in the upper zone and a portion of the substantially anhydrous caustic alkali is removed from the process as product material and another portion of the substantially anhydrous caustic alkali is used to serve as the fluid body to pass from the upper zone to the heat exchange zone and thereby serve as the heat transfer medium for the evaporation-dehydration of the aqueous caustic alkali feed solutions injected into the substantially anhydrous caustic alkali which is contained in the lower portion of the elongated dehydration zone.

Figures 1, 3 and 5 represent schematic drawings of vertical sections through types of apparatus which may be used in performing the evaporation-dehydration method in accordance with this invention.

Figures 1, 2:
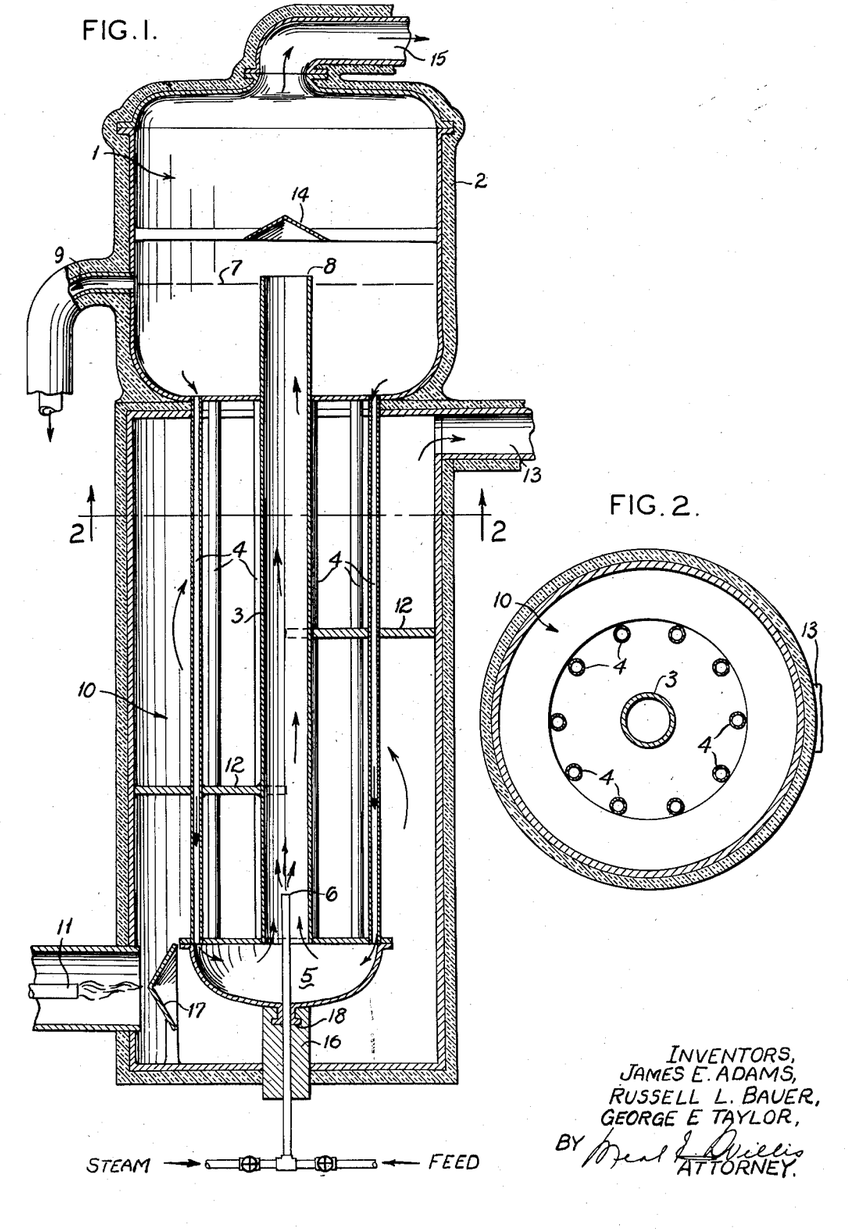
Figure 1 is a schematic drawing of a vertical section through a preferred type of apparatus and Figure 2 is a cross-section of the same apparatus across line 2—2.

In Figure 1, an "upper zone" is represented by chamber 1, jacketed with an insulating material 2. A "heat transfer zone" to which a fluid body may flow, as by gravity, from the "upper zone" is represented by a plurality of substantially vertical elongated conduits 4 which are in direct heat exchange relationship with a high temperature heat source such as the hot combustion gases contained in the furnace chamber 10. The phrase "heat exchange tubes" will be used herein as descriptive of parts of an apparatus having the same function as the elongated conduits 4, namely the function of effecting heat transfer from the high temperature heat source to the fluid body.

An "elongated dehydration zone" is represented by an elongated conduit 3 which is substantially vertical and located in the lower portion of chamber 1 and which has a substantially larger cross-sectional area than the total of the cross-sectional areas of the heat exchange tubes 4. The lower extremities of the elongated heat exchange conduits 4 of the heat transfer zone and the lower extremity of the elongated dehydration zone conduit 3 terminate in a common header chamber 5 whereby a fluid body may flow or pass from the heat transfer zone to the lower portion of the elongated dehydration zone conduit 3. Circulatory liquid communication is therefore provided, under the proper conditions, whereby a liquid or fluid body contained in the lower portion of chamber 1 or "upper zone" may pass from chamber 1 down through the elongated heat exchange conduits 4 of the "heat transfer zone" and thence pass through the header chamber 5 to the lower portion of the "elongated dehydration zone" conduit 3, up through the "elongated reaction zone conduit" 3 and thereby returning to the chamber 1 or "upper zone."

A fluid body consisting of a caustic alkali solution of the desired final concentration, which may be substantially anhydrous caustic alkali or a caustic alkali solution containing more than 1% water, is maintained in a fluid state and at a predetermined level 7 within chamber 1. The fluid body level 7 is shown as being maintained at a predetermined point by means of an over-flow conduit 9, which also serves as a means for continuously withdrawing a portion of the fluid body as product material. The preferred level 7 is shown as being substantially coincident with the upper extremity 8 of the elongated dehydration zone conduit 3, although, in the alternative, the upper extremity of the elongated reaction zone conduit 3 may be maintained above or below the level 7. Under static conditions, when chamber 1 is full of the fluid body to the desired level 7, the heat exchange tubes 4 and the header chamber 5 are also filled with the fluid body and the elongated dehydration zone conduit 3 is filled with the fluid body to a level corresponding to the level 7 in chamber 1.

The heat exchange tubes 4, the elongated dehydration zone 3 and the connecting header chamber 5 are shown in Figure 1 as being in direct heat exchange relationship with a high temperature heat source such as the chamber forming means 10 containing a high temperature heat transfer medium, which high temperature heat source is represented in Figure 1 as being a furnace chamber 10 containing the hot combustion gases of a gas burner 11. The high temperature heat transfer medium is distributed throughout the chamber forming means 10 and around and in contact with heat exchange tubes 4 and the elongated dehydration zone 3 by means of suitable baffling means 12. A stack 13 represents an exit for the combustion gases when such gases are used as the high temperature heat source.

By means of feed inlet nozzle 6, a feed stream of an aqueous solution of a caustic alkali to be concentrated is injected into the heated fluid body contained in the lower portion of the elongated dehydration zone conduit 3. The feed inlet nozzles as represented by nozzle 6 may be designed in any number of fashions. The nozzle may be of the orifice type and each nozzle may eject a single or a plurality of streams of feed reactants or other materials. In many instances satisfactory injection of the feed stream has been accomplished by using a simple injection nozzle as the open end of a small diameter pipe. Nozzle 6 is preferably located in the lower portion of the elongated reaction zone conduit 3 and a short distance above the lower extremity of the elongated dehydration zone conduit. When a single nozzle is used, the nozzle is preferably centrally located within the cross-section of the elongated dehydration zone conduit, however, when more than one nozzle is employed, they are preferably symmetrically located within the cross-section of the elongated dehydration zone conduit. The feed stream or streams are preferably injected into the fluid body contained in the lower portion of the elongated dehydration zone conduit substantially parallel to the longitudinal axis of the elongated reaction zone conduit.

The water contained in the aqueous feed solutions flashes into superheated steam upon being injected into the hot fluid body contained in the lower portion of the elongated dehydration zone conduit which fluid body has been previously heated during the passage of the fluid body through the heat exchange zone. This flashing action of the water of the aqueous solution promotes substantially instantaneous evaporation-dehydration of the aqueous feed solution of the caustic alkali to form a more concentrated caustic alkali solution and superheated steam. The rapid rise of the superheated steam through the length of the elongated dehydration zone conduit 3, combined with the initial motion imparted to the fluid body due to the velocity of the aqueous streams injected from the inlet nozzle, results in a high velocity upward motion of the steam bubbles and the fluid body through the length of the elongated dehydration zone conduit 3, thereby returning the fluid body to chamber 1. This rapid upward movement of the fluid body within the elongated dehydration zone conduit 3 induces rapid circulation of the fluid body contained in the lower portion of chamber 1, down through the heat transfer tubes 4 into the header chamber 5 and thence into the lower portion of the elongated dehydration zone conduit 3 and upwards through the elongated dehydration zone conduit past nozzle 6, whereby the heated fluid body is continuously supplied immediately adjacent to the injection nozzle 6. During the passage of the fluid body through the heat transfer tubes 4, the fluid body acquires sufficient additional heat so that this heated fluid body may serve as the high temperature heat transfer medium to supply the heat requirements for the conversion of the water of the aqueous feed solutions to superheated steam and also supply the heat requirements for the evaporation-dehydration of the aqueous feed solution of the caustic alkali without cooling the fluid body below the temperature at which the equilibrium conditions provide a substantially anhydrous caustic alkali or a caustic alkali solution of the desired final concentration, whichever is desired.

The fluid body consisting of the concentrated caustic alkali which served as the heat transfer medium and also the additional quantities of concentrated caustic alkali formed by the evaporation-dehydration of the aqeous feed solution of caustic alkali leaves the upper extremity 8 of the elongated dehydration zone conduit 3 together with a stream of superheated steam at a considerable velocity; and therefore a suitable provision is made for disentraining the fluid body from the stream of superheated steam. Any one of many conventional disentraining devices may be employed; however, the upper portion of chamber 1 is shown as being provided with a suitable baffling means 14 so as to function as a disengaging zone to disentrain the fluid body from the stream of steam and any other vaporized materials, and the steam together with any other vaporized materials are then removed from the apparatus by means of vapor outlet 15, and the disentrained fluid body falls back from the baffling into the lower portion of chamber 1 to maintain the level of the fluid body at the predetermined level 7 for recirculating through the heat exchange tubes 4, and the excess of the fluid body level 7 is continuously withdrawn through the over-flow outlet 9 as the product material.

The design of the apparatus of Figure 1 may be modified so that the lower extremity of the elongated dehydration zone terminates at about the floor level of the furnace chamber 10 and thereby placing the header chamber 5 outside of the furnace chamber. By placing the header chamber 5 below the floor of the furnace chamber, the header chamber is more readily accessible. One advantage of having the header chamber 5 within the furnace chamber is the fact that heat loss from the materials which are circulating through the header chamber 5 is materially reduced. However, if the alternative modification were desired wherein the header chamber 5 would be below the floor of the furnace chamber, the heat loss from header chamber 5 could be very effectively minimized by insulating the outside surface of header chamber 5.

In Figure 1, an insulation 16 is placed around that portion of the feed line 17 which passes in direct heat exchange relationship with the high temperature heat source, whereby excessive premature heating of the aqueous solutions within the feed line is avoided. Premature heating of this portion of the feed line to a high temperature may cause steam formation within the feed line which may result in improper functioning of the injection nozzle 6. This problem of premature heating of the feed line is, of course, not encountered when the lower surface of the header chamber is outside of the furnace chamber.

Figures 3, 4:
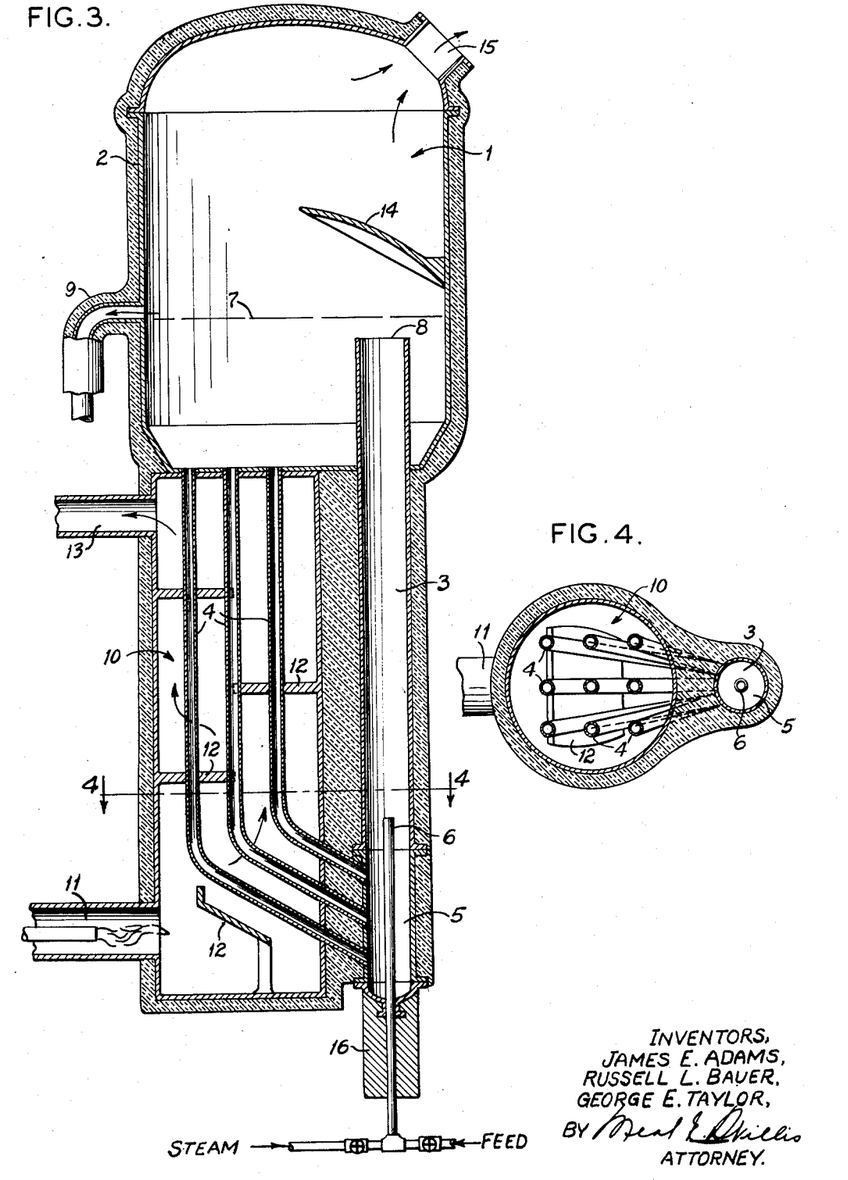
Figures 3 and 5 represent vertical sections through alternative types of apparatus which may be used in carrying out the evaporation-dehydration process of this invention.
Figure 4 represents a cross-section along line 4—4 of the apparatus shown in Figure 3.

Figure 3 shows a further modification of the design of the apparatus of Figure 1, and Figure 3 is a vertical section through such an apparatus and Figure 4 is a cross-sectional view through line 4—4. In Figure 3 the elongated dehydration zone conduit 3 and the header chamber 5 have been taken outside of the furnace chamber 10. In actual practice, very little, if any, heat transfer is made from the furnace chamber 10 to the fluid body through the elongated dehydration zone conduit 3 or through the header chamber 5. The placing of the elongated dehydration zone conduit 3 within the furnace chamber accomplishes the purpose of reducing the heat loss from the material within the elongated dehydration zone conduit. However, the process of this invention may be carried out efficiently in an apparatus where the heat exchange tubes 4 are within the furnace chamber 10 and the elongated dehydration zone conduit and the header chamber 5 are placed outside of the furnace chamber 10 and well insulated to prevent heat loss.

In Figure 1, the header chamber 5 was used to provide liquid communication between the lower extremities of the heat exchange tubes 4 and the lower portion of the elongated dehydration zone conduit 3. However, in Figure 3, the lower extremities of the heat exchange tubes 4 actually terminate in the lower portion of the elongated dehydration zone conduit 3, and header chamber 5 of Figure 3, therefore, may be considered as being the lower portion of the elongated dehydration zone conduit 3 rather than as a separate and distinct chamber. For large scale operations, an apparatus to carry out the novel aspects of this invention may be designed having more than one elongated dehydration zone conduit, each one having at least one feed inlet nozzle, and a plurality of several hundred heat exchange tubes 4.

In the types of apparatus as represented in Figures 1 and 3, instead of using combustion gases as the high temperature heat transfer medium, chamber 10 may be modified so as to receive high temperature vapors from some other source, as for example, the design of chamber 10 may be modified so as to receive mercury vapors from a mercury boiler and the mercury vapors passing in contact with the heat exchange tubes 4 would serve as the high temperature heat source to provide the additional heat to be transferred to the fluid body passing through the heat exchange tubes 4. On the other hand, the heat exchange tubes may be heated by radiant energy or a combination of radiant and convection heat if so desired.

Figures 5, 6:
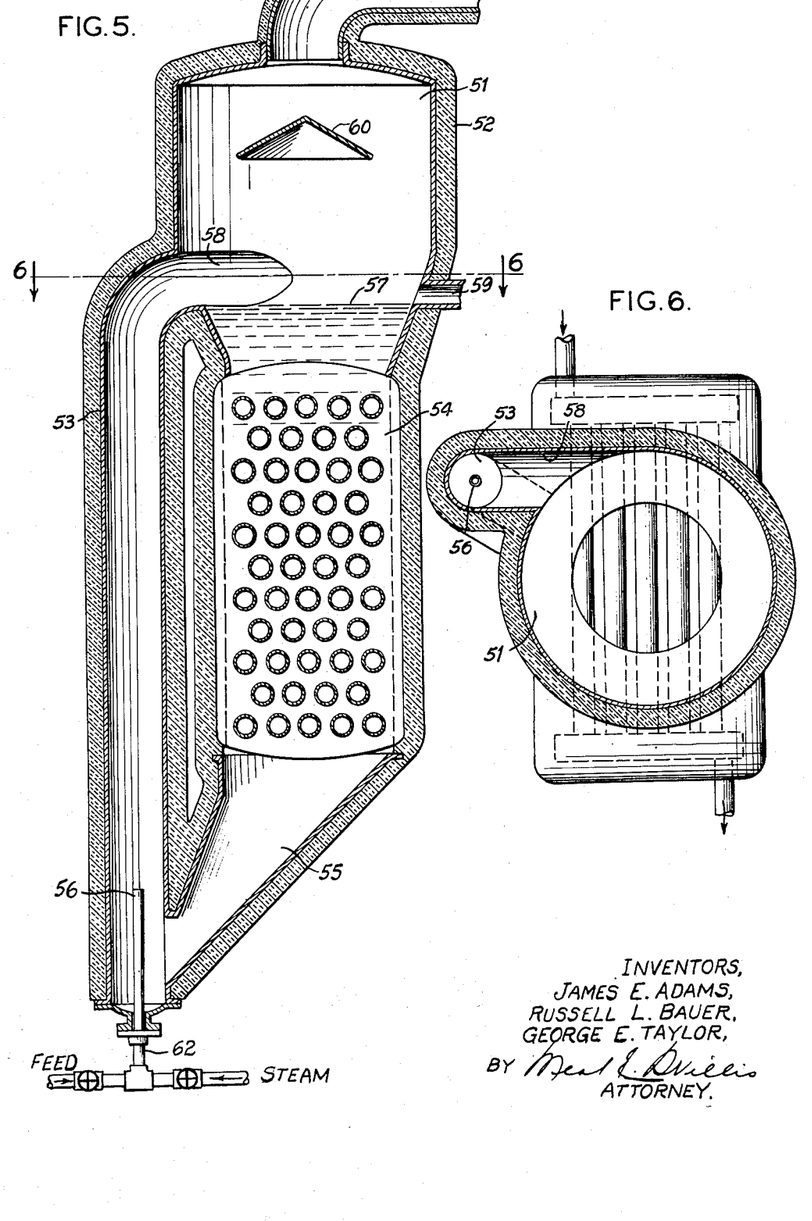
Figure 6 is a cross-section through line 6—6 of the apparatus shown in Figure 5.

Figure 5 is again a vertical section and represents another type of apparatus that may be used to carry out the process of this invention, and Figure 6 is a cross-section of the same apparatus across line 6—6. In Figure 5, the "upper zone" is represented by chamber 51, jacketed with an insulating material 52. The fluid body contained in the lower portion of chamber 51 may pass by gravity to a heat exchange zone wherein the fluid body passes around and in contact with a plurality of horizontal or inclined heat exchange tubes 54 through which may pass a high temperature heat transfer medium such as the mercury vapors from a mercury boiler, a molten mixture of sodium nitrite-sodium nitrate or one of the well known silicone polymer type of high temperature heat transfer fluids. The fluid body in passing around and in contact with the plurality of heat exchange tubes 54 is therefore heated to a higher temperature by indirect heat exchange with the high temperature heat transfer medium circulating through the heat transfer tubes. The heated fluid body then passes from the heat transfer zone by means of the connecting conduit 55 to the lower portion of an elongated dehydration zone conduit 53. One or more streams of an aqueous feed solution are injected into the heated fluid body by means of one or more nozzles 56 and, as described hereinbefore, the water of the aqueous solution flashing into superheated steam and rising through the elongated dehydration zone conduit 53 returns the fluid body to the upper zone of chamber 51. Figure 5 illustrates a different method for disentraining the fluid body from the vaporized materials. In Figure 5 the elongated dehydration zone conduit has a section 58 which enters the upper chamber 51 substantially tangentially to a wall of chamber 51. The fluid body and the vaporized materials, therefore, leave the upper extremity of conduit 53 at a rather high velocity and due to the tangential positioning of the upper extremity of conduit 53 with respect to the wall of chamber 51 these materials issue into chamber 51 with a circular motion providing a cyclonic effect to aid in the separation of the vaporized materials (such as the superheated steam) from the fluid body. This cyclonic action coupled with suitable baffling means 60 in the upper portion of chamber 51 serves to disentrain the fluid body from the steam and other vaporized materials. The vaporized materials, including, of course, the steam, are then removed from chamber 51 through vapor outlet 61 and the disentrained fluid body falls back into the lower portion of chamber 51 to maintain the fluid body level 57 and the excess of the fluid body is removed through over-flow outlet 59.

While the elongated dehydration zone conduit 3 in Figures 1 and 3 and the elongated dehydration zone conduit 53 in Figure 5 are shown as being vertical or substantially vertical, the design of the apparatus may be modified so that the elongated dehydration zone conduits and/or the heat exchange tubes are inclined, as at an angle of 45° or any other convenient angle.

From the foregoing discussion of the types of apparatus and modifications which are suitable for carrying out the process of this invention, it is readily seen how the process of this invention may be applied for the purpose of carrying out the evaporation dehydration of aqueous caustic alkali solutions on a continuous basis. The process of this invention, of course, has as one of its primary objectives the carrying out of the actual evaporation-dehydration step on a continuous basis. The concentrated caustic alkali product, will, of course, have to be removed from the upper zone as a portion of the fluid body which is continuously removed from the chamber 1 as by outlet 9. These details will be evident and more clearly understood from the following examples of actual operation.

EXAMPLE OF OPERATION

Apparatus

An apparatus was constructed in a design substantially as shown in Figure 1, and this apparatus was used in the carrying out of the evaporation-dehydration operations which will be herein described. All of the metallic parts which were in contact with the fluid body, including the chamber 1, the elongated dehydration zone conduit 3, the heat exchange tubes 4, the header chamber 5, the feed inlet nozzle 6 and the baffling 14 were fabricated from a nickel alloy stainless steel commonly known to the trade as Inconel. The entire evaporation-dehydration apparatus was structurally designed to permit variations of pressures within the apparatus from 0 to 65 pounds per square inch absolute. The chamber 1 was substantially cylindrical with a diameter of about 4 feet and a height of about 10 feet. Centrally located with respect to the bottom of chamber 1 was an elongated reaction zone conduit 3, six inches inside diameter and approximately 25 feet in length. The elongated conduit 3 extended up into chamber 1 about 5 feet and depended into furnace chamber 10 approximately 20 feet. Also fitted into the bottom of chamber 1, the bottom of chamber 1 functioning as a tube sheet, and equally spaced in a 9-inch circle around the elongated reaction zone conduit 3 (Figure 2 illustrates this arrangement), were ten 1½ inch heat exchange tubes 4 which were substantially 20 feet long. The lower extremity of the elongated dehydration zone conduit 3 and the lower extremities of the heat exchange tubes 4 terminated in a common header chamber 5 such as is represented in Figure 1.

The elongated dehydration zone conduit and the heat exchange tubes depending into the furnace chamber 10 were heated by hot gases, combustion gases plus secondary air, from a gas burner 11 capable of delivering up to 3,000,000 B. t. u. per hour and a maximum discharge temperature of 2,000° F. By proper control of the natural gas and primary and secondary air supplies to the gas burner, it was possible to obtain discharged gases into the furnace chamber at any desired temperature from ambient temperatures up to 2,000° F. The temperatures of the discharged burner gases were controlled by means of an automatic temperature control system which continuously analyzed the temperature of the fluid body contained in the lower portion of chamber 1, the temperature of the fluid body leaving the heat exchange zone, and the temperature of the exit gases leaving chamber 10 through stack 13, and relayed this information to an automatic system which controlled the air and gas amounts and ratio to the burner 11 and thereby controlled the temperature of the discharge burner gases so as to maintain the fluid body in chamber 1 at a predetermined temperature. The furnace chamber was so baffled that none of the heat exchange surfaces could "see" the flame of the gas burner and the gases entering the lower portion of the furnace chamber were guided by means of suitable baffling so that the hot gases were suitably distributed over the heat exchange tubes.

The fluid body level within chamber 1 was maintained so that the upper extremity 8 of the elongated dehydration zone conduit 3 terminated substantially at the fluid body level 7. Also, the upper portion of the chamber 1 contained the baffling so that the upper portion of chamber 1 acted as a disengaging zone to disentrain the fluid body from the vaporized materials, and the vaporized materials were removed by means of vapor line 15 connected to the top of chamber 1 and the fluid body consisting of a caustic alkali of the desired final concentration was removed by means of an over-flow pipe 9 arranged substantially as shown in Figure 1.

The lower surface of the header chamber 5 contained a flanged opening 18 to facilitate the positioning of the feed inlet nozzle 6 substantially centrally located within the cross-section of the lower extremity of the elongated dehydration zone conduit 3 and the feed inlet nozzle extended substantially co-axially up into the elongated conduit 3 for a distance of about one foot. The feed inlet nozzle 6 was designed to provide for introducing a single stream of an aqueous feed solution substantially co-axially into the elongated conduit 3 at high velocities of the order of 50 to 150 feet per second to facilitate the injection of the aqueous feed solutions into the heated fluid body. The inlet nozzle was provided with piping and valving outside of the furnace chamber to facilitate the alternative admission of steam into the fluid body contained within the conduit 3 during the initial start-up periods and also to maintain circulation within the apparatus in the event that the supply of feed solution should fail.

Start-up

To start up this process for the manufacture of anhydrous caustic soda, the dehydration apparatus may be filled to the predetermined level with anhydrous caustic soda which is transferred to the apparatus in the molten state, or the apparatus may be filled with anhydrous caustic soda by the evaporation of 70% caustic soda to anhydrous caustic soda within the dehydrator. To accomplish the filling of the apparatus with anhydrous caustic soda, the gas burner 11 is ignited and the dehydrator was slowly heated to 250° F. (that is, pre-heated to a temperature well above the solidifying point of 70% caustic soda so that the 70% caustic soda solution initially charged to the dehydrator would not solidify) and the pre-heated dehydration apparatus was then charged with molten 70% caustic soda solution to the predetermined level 7. A small amount of steam was then continuously injected into the 70% caustic soda solution through the nozzle 6 to induce circulation of the caustic soda within the dehydration apparatus during this initial dehydration of 70% caustic soda solution to anhydrous caustic soda, while the heat input into the furnace chamber 10 was gradually increased by increasing the temperature combustion gases from burner 11 about 50° F. each 20 minutes. When the temperature of the circulation caustic soda solution had reached about 350° F. evaporation of water began to take place. As the water evaporated, with an accompanying drop in the liquid level within chamber 1, the steam was shut off from the nozzle 6 and 70% caustic soda solution was added to the dehydration apparatus through nozzle 6 until the desired liquid level was restored. Evaporation and circulation of the caustic soda was continued until the dehydrator had been filled to the desired level with caustic soda at a temperature of 725–750° F., at which temperatures the equilibrium conditions between the steam and the molten caustic soda result in the fluid body of caustic soda in chamber 1 being substantially anhydrous caustic soda. The steam which was being injected into the elongated dehydration zone to facilitate circulation was then shut off, at which point the apparatus is ready to begin the continuous production of anhydrous caustic soda by the evaporation-dehydration of caustic soda solutions.

*Continuous production of anhydrous caustic soda from caustic soda solutions*

EXAMPLE I

After the apparatus had been filled with anhydrous caustic soda at a temperature of 725–750° F., as described under "Start-up," the automatic temperature control system was then set so as to maintain the molten caustic soda contained in the caustic soda reservoir (of the lower portion of chamber 1) at a temperature of substantially 735° F. The automatic flow control system was then set so as to deliver 70% caustic soda solution at a temperature of 250° F. to the injection nozzle 6 at the rate of 60 gallons per hour. During this run the injection nozzle 6 consisted of a nozzle having a single orifice jet of 0.07 inches diameter which ejected a stream of caustic soda solution into the molten body of caustic soda contained in the elongated dehydration tube 3 at a linear velocity of about 100 feet per second at the 60 gallon per hour feed rate. The injection of the caustic solution into the body of molten caustic soda contained in the elongated tube 3 proceeded smoothly with a continuous production of anhydrous caustic soda. During the first few hours, fluctuations in the temperature of the anhydrous caustic soda contained in the lower portion of chamber 1 had levelled out and was holding close to 735° F. The temperature of discharge gases from burner 11 averaged 1500° F. throughout the process and an average temperature of 1150° F. was recorded for the stack gases leaving the furnace chamber 10. The overall calculated heat input by the gas burner 11 was of the order of 825,000 B. t. u. per hour. The circulation of the molten anhydrous caustic soda across the high temperature heat transfer areas was very even and, in particular, the circulation of the molten anhydrous caustic soda down through the heat exchange tubes 4 was maintained at an average of five linear feet per second. Thermocouples installed in wells in the header chamber 5 and spotted at various points among the heat exchange tubes 4 indicated no localized over heating at any point, and a uniform temperature increase of 2° F. during the passage of the molten caustic soda through the full length of the heat exchange tubes 4 was observed. After twenty-four hours of continuous operation, 8920 pounds of anhydrous caustic soda containing 0.55% water had been produced and withdrawn from the apparatus. This example shows how substantially anhydrous caustic soda may be produced from aqueous caustic soda solutions using anhydrous caustic soda as the high temperature heat transfer medium for the dehydration of the caustic soda solution. Efficient and adequate circulation of the caustic soda across the high temperature heat transfer areas was accomplished in the total absence of any mechanical stirring or pumping. The combination of the injection velocity of the feed stream into the anhydrous caustic soda contained in the elongated dehydration zone coupled with the action of the flashing of the water of the caustic soda solutions into superheated steam resulted in a rapid upward motion of the anhydrous caustic soda and steam within the elongated dehydration tube 10 which effected smooth and even circulation of the anhydrous caustic soda by gravity down through the heat exchange tubes 4 whereby this caustic soda acquired sufficient heat to function as the high temperature heat transfer medium when in contact with the caustic soda solution ejected from nozzle 6 within the elongated dehydration zone 3 whereupon the anhydrous caustic soda was returned to chamber 1 by passage through the elongated dehydration zone 3.

EXAMPLE II

This run was similar to the run in Example I except that the following run was made at a lower feed rate than the feed rate of Example I. After the apparatus had been filled with molten anhydrous caustic soda at a temperature of about 750° F., as desrribed in the start-up procedure, the automatic temperature control system was set to maintain the temperature of the molten caustic soda in the lower portion of chamber 1 at a temperature of 745° F. The automatic flow control system was set to deliver 70% caustic soda solution at 250° F. to the injection nozzle 6 at the rate of 30 gallons per hour. During this run the injection nozzle 6 consisted of a single orifice jet of 0.07 inches diameter which ejected a stream of caustic soda solution at a linear velocity of about 50 feet per second at the 30 gallon per hour feed rate into the body of molten anhydrous caustic soda contained in the elongated dehydration tube. The fluctuation in the temperature of the anhydrous caustic soda contained in the lower portion of chamber 1 had leveled out after three hours of operation and for the next twenty-four hours averaged 745° F. with a variation of only plus or minus 2° F. The temperature of the discharge gases from burner 11 averaged 1350° F. during the course of the run. The temperature of the stack gases leaving the furnace chamber 10 were recorded at an average of 1100° F. The calculated heat output of the gas burner 11 during the course of this run was of the order of 400,000 B. t. u. per hour. The molten anhydrous caustic soda circulated through the heat exchange tubes at the rate of three linear feet per second, and the thermocouples installed at the header chamber 5 and at various points among the heat exchange tubes 4 indicated no localized or excessive overheating at any point and a uniform temperature increase of about 2° F. during the passage of the molten caustic soda through the whole length of the heat exchange tubes 4 was recorded. Twenty-four hours of continuous operation produced 4450 pounds of anhydrous caustic soda containing 0.25% of water. After the initial three hour start-up period, the process ran very smoothly and required very little attention of the operator.

EXAMPLE III

During this run, the temperature control system was set to maintain the molten anhydrous caustic soda in the lower portion of chamber 1 at a temperature of 735° F. The automatic flow control system was set to deliver 150 gallons per hour of 70% caustic soda solution at 250° F. to the injection nozzle 6. During this run, the injection nozzle 6 consisted of a single orifice jet of 0.125 inches diameter which ejected a stream of caustic soda solution into the body of molten anhydrous caustic soda in the elongated dehydration tube at a linear velocity of about 65 feet per second. After about three hours of operation, the process variations leveled out and the production of anhydrous caustic soda progressed smoothly and continuously. The temperature of the discharge gases from burner 11 averaged about 1800° F. and the temperature of the stack gases leaving furnace chamber 10 were recorded at an average of 1175° F. during the course of this run. The calculated heat input for this run was at the rate of 2,100,000 B. t. u. per hour. The molten anhydrous caustic soda circulated through the heat exchange tubes at a substantially constant rate of 10 feet per second. The thermocouples located in the header chamber 5 and at various points along the heat exchange tubes 4 indicated no localized overheating at any point and recorded a uniform temperature increase of 3° F. during the passage of the molten anhydrous caustic soda through the full length of the heat exchange tubes 4. The twenty-four hour period of continuous operation, following the initial three hour start-up period, produced 22,295 pounds of anhydrous caustic soda containing 0.85% of water.

EXAMPLE IV

This run was made to show the practicability of using this process to concentrate caustic soda solutions to some point below anhydrous caustic soda. The dehydration apparatus was filled with molten 70% caustic soda solution and the temperature gradually increased to 360° F. The automatic temperature control system was set to maintain the 70% caustic solution in the lower portion of chamber 1 at 360° F. and after the temperature had leveled out at this point, the introduction of 50% caustic soda solution at room temperature was begun through nozzle 6. The 50% caustic soda solution was injected into the 70% caustic soda solution contained in the elongated dehydration tube 3 at the rate of 110 gallons per hour. During this run the injection nozzle 6 consisted of a single orifice jet of 0.125 inch in diameter which ejected the 50% caustic soda solution stream at the rate of 47 feet per second. The process very quickly settled down to a smooth and continuous running process and within one hour all of the temperature recording instruments had leveled out to almost uniform records with very little fluctuations. The temperature of the caustic soda solution in the lower portion of chamber 1 was held close to 360° F. and the temperature of the discharge gases from burner 11 held very close to 1350° F. and the temperature of the stack gases leaving the furnace chamber 10 was recorded at an average of 1100° F. The calculated heat output of burner 11 was of the order of 840,000 B. t. u. per hour. The 70% caustic soda solution circulated through the heat exchange tubes 4 at the rate of 7 linear feet per second. The recording of the thermocouples installed at header chamber 5 and at various points among the heat exchange tubes 4 indicated no localized overheating to any point and a substantially uniform temperature increase of 2° F. was recorded during the passage of the 70% caustic soda solution through the full length of the heat exchange tubes 4. After twenty-four hours of continuous operation, 23,945 pounds of 70% caustic soda solution had been produced.

This example exemplifies how 70% caustic soda solution can be used as a high temperature heat transfer medium for the dehydration of 50% caustic soda when the 70% caustic soda is maintained within the close temperature limits to the temperature at which equilibrium conditions effect the evaporation-dehydration of the caustic soda solution to the desired concentration, such as is possible in the practice of the process of this invention.

It can now be understood from the foregoing discussion of the invention, the description of suitable apparatus and the examples, how this invention makes it possible to produce substantially anhydrous caustic alkalies with minimized caustic embrittlement problems of the apparatus. It was earlier pointed out that the most critical conditions from a corrosion or caustic embrittlement standpoint, appears to be in the neighborhood of 70–85% concentration and temperatures of 350–450° F., whereas these corrosion or caustic embrittlement problems are substantially reduced where the materials of construction are in contact with substantially anhydrous caustic soda at temperatures of 600° F. and above. In the practice of this invention for producing substantially anhydrous caustic soda, particularly when the invention is carried out in a preferred design of apparatus, as shown in the drawings, all of the interior surfaces of the apparatus are always in contact with substantially anhydrous caustic soda at temperatures above 600° F., and usually at temperatures of the order of 710–750° F. Even in the elongated dehydration zone where the dehydration of the aqueous caustic soda feed solutions takes place, there is always present such a large volume of substantially anhydrous caustic soda as compared to the volume of the feed solution being injected into the anhydrous caustic soda, that there is practically no contact between the relatively dilute caustic soda feed solution and the interior surface of the elongated dehydration zone. This is due to two factors, namely, the aqueous feed solution is intimately dispersed in a much larger volume of anhydrous caustic soda, and also, the dehydration of the aqueous feed solution takes place almost instantaneously. The advantageous result is thereby obtained of having all of the interior surfaces of the apparatus always in contact with substantially anhydrous caustic soda, and contact of the surfaces with the more corrosive aqueous caustic soda solutions is virtually eliminated.

The principles of this invention may also be used to modify the conventional fusion pot method of dehydrating caustic alkali solutions thereby making it possible to place the fusion pot dehydration method on more or less a continuous basis. A feed line for delivering the dilute caustic alkali solution which is to be concentrated or dehydrated may terminate at a point near the bottom of the fusion pot. The discharge nozzle may discharge a stream of dilute caustic alkali feed solution tangentially or substantially tangentially to the interior surface of the fusion pot. In this manner, the body of the hot caustic alkali in the fusion pot would serve to dehydrate the stream of aqueous feed solution which is injected into the hot caustic alkali and substantially continuous production could be obtained. However, the circulation would be less efficient and rate of heat transfer would be low and therefore, the production rate would be substantially less as compared to the results which are obtainable with an apparatus of a design such as are shown in Figures 1, 3 and 5. Even in the conventional fusion pot method, the fusion pot could be equipped with a centrally located substantially vertical conduit, the lower extremity of which would be separated from the bottom of the fusion pot and the upper extremity of which could terminate at the upper level of hot caustic solution in the fusion pot, in which case the aqueous feed solution could be injected upwardly within the vertical conduit, and in a crude manner thereby accomplish a result similar to that described for the preferred types of apparatus, however, such an operation would be quite inefficient compared to the apparatus described, although it would represent an improvement over the conventional method of operation of the fusion pots.

As pointed out before, the apparatus may be designed to operate under pressure whereby the superheated steam leaving the upper zone may be recovered and used as process steam for other chemical operations. This could be an important factor in some chemical plants as the steam leaving the upper zone has a high degree of superheat. On the other hand, the process of this invention permits the design of apparatus whereby the evaporation-dehydration process may be carried out under sub-atmospheric pressures, which is practically impossible for conventional fusion pot operation. If the dehydration process is carried out under sub-atmospheric pressures, this permits the operation of the process with lower temperatures for the molten body of caustic soda which circulates through the apparatus and therefore substantially reduces the heat requirements necessary for the operation of the process. If a batch-wise operation, such as is used in the fusion pot method, were attempted under sub-atmospheric pressures, a range must be passed through during the evaporation-dehydration process, before the substantially anhydrous stage is reached, during which the melting point of the partially dehydrated caustic soda solution is above the boiling point of the caustic soda solution at the reduced pressure, and therefore solidification of the mass of partially dehydrated caustic soda solution is encountered; however, in the process of this invention, the substantially anhydrous caustic soda may be maintained in a fluid state at all times at a temperature above the range wherein a solid phase is encountered under reduced pressures in batch-wise operation, due to the fact that in the process of this invention, the evaporation-dehydration takes place so rapidly in the lower portion of the elongated dehydration zone that the caustic soda solution passes through the critical partially dehydrated solidifying range about instantaneously. This instantaneous dehydration of the caustic soda solution, coupled with the relatively large volume of molten substantially anhydrous caustic soda which is continually passing into the elongated dehydration zone results in a fluid mobile mass of substantially anhydrous caustic soda at all times even when the process is operating even under sub-atmospheric pressures,

What is claimed is:

1. In a continuous process for the concentration of relatively dilute aqueous caustic alkali solution by evaporation-dehydration, the steps comprising introducing a stream of said dilute caustic alkali into and in concurrent flow relationship to a stream of heated concentrated caustic alkali moving upwardly in a substantially vertical elongated zone whereby water of said dilute caustic alkali is evaporated to form superheated steam and additional concentrated caustic alkali and whereby said formation of superheated steam effects the upward movement of said stream of concentrated caustic alkali, directing said upwardly moving stream of concentrated caustic alkali and superheated steam into a separation zone maintained at temperatures at which equilibrium conditions between superheated steam and the concentrated caustic alkali effect the evaporation-dehydration of the caustic alkali to the desired final concentration and in said separation zone separating superheated steam from concentrated caustic akali of desired final concentration, maintaining a level of concentrated caustic alkali in said separation zone from which concentrated caustic alkali may be withdrawn from the process while continuously removing by gravity flow a portion of said concentrated caustic alkali by indirect heat exchange and heating said portion of concentrated caustic alkali while said portion of concentrated caustic alkali is flowing downwardly by gravity, said portion of concentrated caustic alkali thereby acquiring sufficient heat to provide the heat requirements for the formation of said superheated steam and maintain the required temperatures in said separation zone, and directing said heated portion of concentrated caustic alkali into the lower portion of said substantially vertical elongated zone to form said upwardly moving stream of heated concentrated caustic alkali.

2. In a continuous process for the concentration of aqueous caustic soda solution by evaporation-dehydration to form substantially anhydrous caustic soda, the steps comprising introducing a stream of said aqueous caustic soda solution into and in concurrent flow relationship to a stream of heated molten substantially anhydrous caustic soda moving upwardly in a substantially vertical elongated zone whereby water of said aqueous caustic soda is evaporated to form superheated steam and whereby said formation of superheated steam effects the upward movement of said stream of molten substantially anhydrous caustic soda, directing said upwardly moving stream of molten substantially anhydrous caustic soda and superheated steam into a separation zone maintained at temperatures within the range of about 710 to 750° F. wherein said superheated steam is separated from said molten substantially anhydrous caustic soda, maintaining a level of said molten substantially anhydrous caustic soda in said separation zone from which said molten substantially anhydrous caustic soda may be withdrawn from the process while continuously removing from said separation zone by gravity flow a portion of said molten substantially anhydrous caustic soda and heating said portion of caustic soda by indirect heat exchange while it is flowing downwardly by gravity, said portion of caustic soda thereby acquiring sufficient heat to provide the heat requirements for the formation of said superheated steam and maintain the temperature of the molten substantially anhydrous caustic soda in said separation zone at temperatures within the range of about 710 to 750° F., and directing said heated portion of molten substantially anhydrous caustic soda into the lower portion of said substantially vertical elongated zone to form said upwardly moving stream of heated molten substantially anhydrous caustic soda.

References Cited in the file of this patent
UNITED STATES PATENTS

| Number | Name | Date |
|---|---|---|
| 497,088 | Blackman | May 9, 1893 |
| 1,433,040 | Sandberg | Oct. 24, 1922 |
| 2,022,037 | Hanchett | Nov. 26, 1935 |
| 2,196,594 | Muskat | Apr. 9, 1940 |
| 2,446,868 | Cunningham | Aug. 10, 1948 |
| 2,562,495 | Hulme | July 31, 1951 |